United States Patent [19]
Wallace

[11] Patent Number: 5,684,337
[45] Date of Patent: Nov. 4, 1997

US005684337A

[54] KEYLESS VEHICLE ENTRY RECEIVER HAVING A DIAGNOSTIC MODE OF OPERATION WHEREIN A CODE COMPARISON IS NOT PERFORMED

[75] Inventor: Mark D. Wallace, Waterford, Mich.

[73] Assignee: TRW Inc., Lyndhurst, Ohio

[21] Appl. No.: 613,133

[22] Filed: Mar. 8, 1996

[51] Int. Cl.$^6$ ................................................. B60R 25/00
[52] U.S. Cl. ................................................. 307/10.2; 180/287
[58] Field of Search ....................... 307/9.1–10.6; 361/171, 172; 180/287, 289; 123/179.2; 70/256; 340/425.5, 426, 825.3–825.32, 825.34, 825.69, 825.72

[56] References Cited

U.S. PATENT DOCUMENTS

| | | | |
|---|---|---|---|
| 4,881,148 | 11/1989 | Lambropoulos et al. | 307/10.2 |
| 5,140,317 | 8/1992 | Hyatt, Jr. et al. | 340/825.31 |
| 5,515,036 | 5/1996 | Waraksa et al. | 340/825.72 |
| 5,519,376 | 5/1996 | Iijima | 307/10.2 |
| 5,539,260 | 7/1996 | Khangura et al. | 307/10.3 |

*Primary Examiner*—Richard T. Elms
*Attorney, Agent, or Firm*—Tarolli, Sundheim, Covell, Tummino & Szabo

[57] ABSTRACT

A receiver is presented herein for use in a keyless vehicle entry system for controlling a vehicle device function, such as unlocking a vehicle door, in response to a vehicle function request signal received from a portable transmitter. The receiver includes a controller having a normal mode of operation during which it receives a request signal and determines whether the request signal is valid and, if so, it initiates the vehicle device function. The controller has a diagnostic mode of operation during which it initiates the vehicle device function in response to receiving a request signal without determining whether the request signal is valid. Provision is made for switching between the modes of operation.

7 Claims, 1 Drawing Sheet

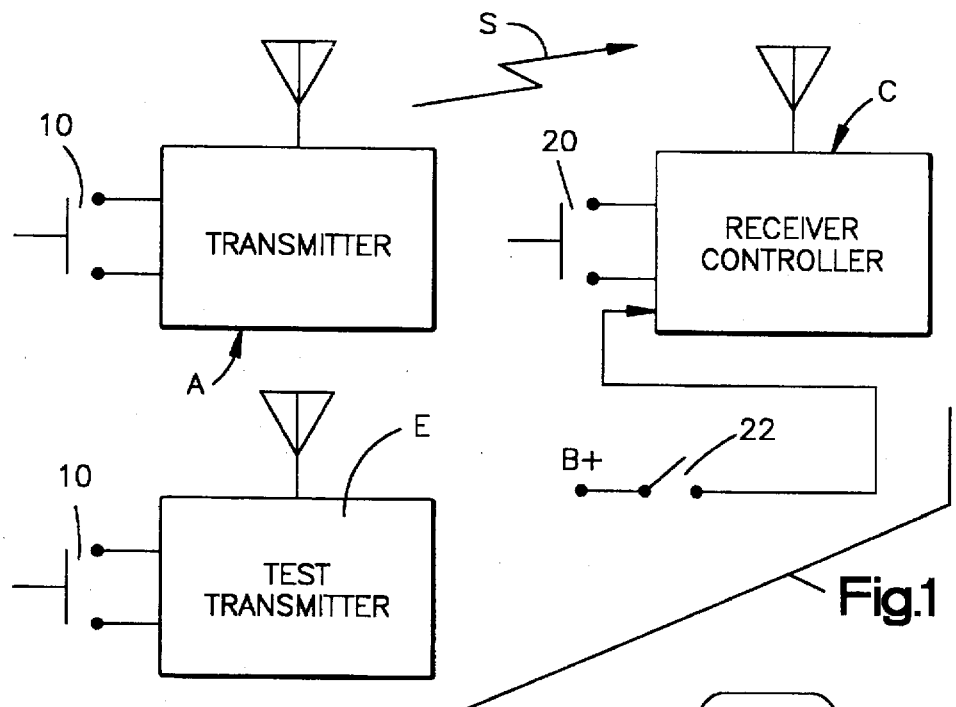
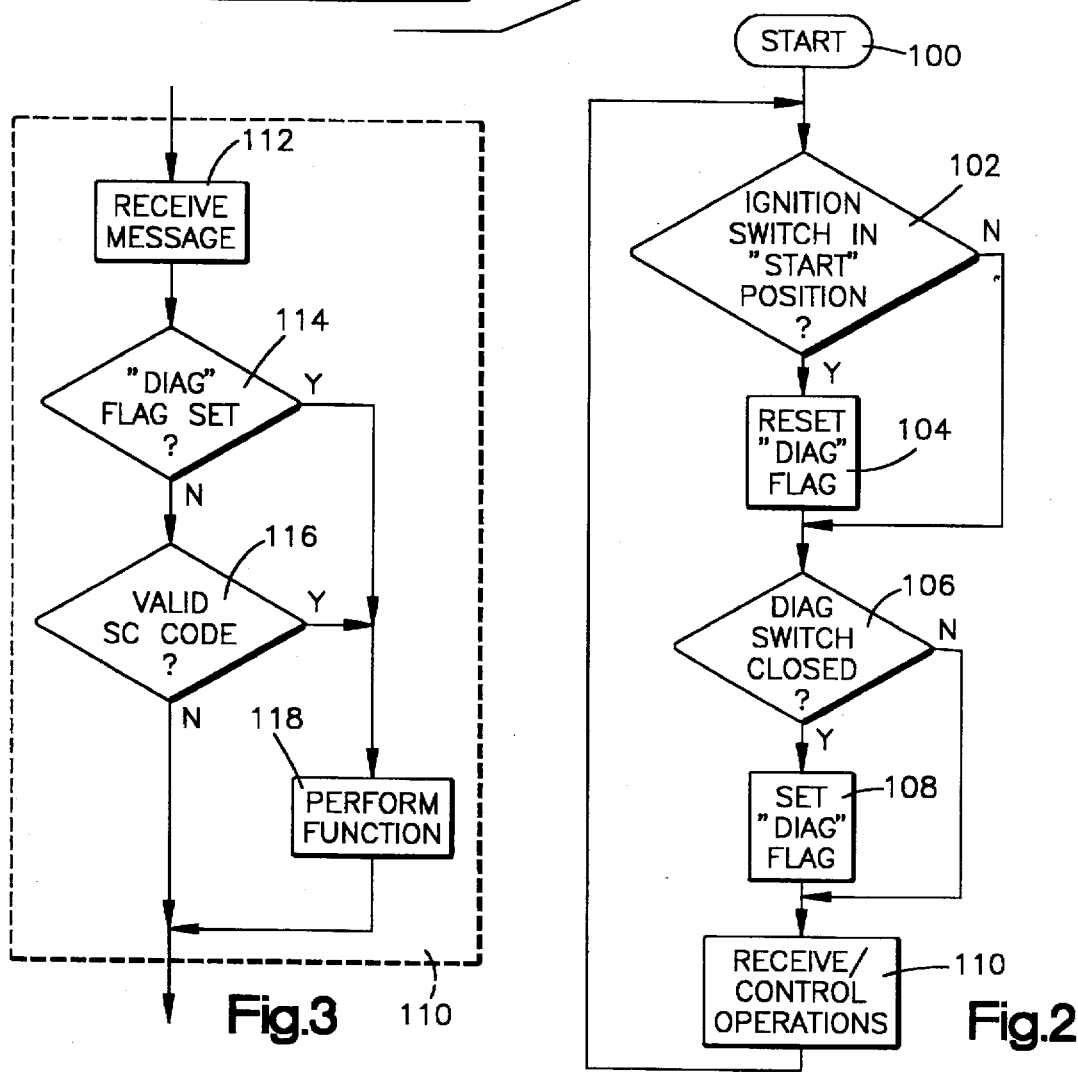

KEYLESS VEHICLE ENTRY RECEIVER HAVING A DIAGNOSTIC MODE OF OPERATION WHEREIN A CODE COMPARISON IS NOT PERFORMED

FIELD OF THE INVENTION

The present invention relates to the art of remote keyless entry systems and, more particularly, to such a system wherein a vehicle mounted receiver has a diagnostic mode of operation.

DESCRIPTION OF THE PRIOR ART

Remote keyless entry (RKE) systems are known in the art for controlling the locking and unlocking functions of a motor vehicle door lock. Such systems include a receiver mounted in a motor vehicle and a portable hand-held transmitter located remote from the receiver. The receiver has a memory which stores one or more security codes, each of which identifies a transmitter which is authorized entry into the vehicle. Each transmitter is provided with one or more manually actuatable switches, each representative of a vehicle control function to be performed, such as the unlocking of a vehicle door. The transmitter includes circuitry that responds to the actuation of one of the switches to transmit a digital signal that includes a security code which uniquely distinguishes the transmitter from a plurality of similar transmitters and a function code representative of the control function to be performed. When the receiver receives such a digital signal, it compares the received security code with each stored security code to determine whether the security code was transmitted by an authorized transmitter. If a match takes place, the receiver responds to the function code by causing performance of the control function requested, as by unlocking a vehicle door. A system as described above is disclosed in the U.S. Patent to Lambropoulos, et al. U.S. Pat. No. 4,881,148, the disclosure is herein incorporated by reference.

In the event that a malfunction takes place in such a RKE system, the owner may request the assistance of a service technician to fix the problem. The technician will first attempt to determine whether the problem is in the receiver or the transmitter. It would be convenient if the technician could check the performance of the receiver through use of another transmitter known to be in proper working order. Unfortunately, the receiver will not respond to such a new transmitter unless the receiver is first programmed to recognize the security code used by the new transmitter. The technician could program the receiver to recognize the new transmitter, but the programming step is time consuming and care must be taken to ensure that, after the repair process is complete, the receiver still responds to the original transmitters but not to the new transmitter used by the technician.

This difficulty may be minimized if the technician could put the receiver into a diagnostic mode of operation during which the security code comparison step is bypassed. This would permit the technician to test the system by employing another test transmitter which is known to be operationally correct but which does not, when actuated, transmit a digital signal having a proper security code. With the security code comparison step being bypassed, the technician may use the test transmitter to determine whether the receiver responds to the function code portion of the digital signal to cause performance of the control function, as by unlocking a vehicle door. If the door is unlocked by the receiver, then the malfunction is deemed to be in the operator's transmitter which may then be repaired and/or replaced. If the door is not unlocked then the malfunction is deemed to be in the receiver, and the receiver may then be repaired and/or replaced.

SUMMARY OF THE INVENTION

In accordance with the invention, a receiver is provided for use in a keyless vehicle entry system for controlling a vehicle device function in response to a request signal received from a portable transmitter. The receiver includes a controller having a normal mode of operation during which it receives the request signal and determines whether the request signal is valid and, if so, it initiates the vehicle device function. The controller also has a diagnostic mode of operation during which it initiates the vehicle device function in response to receiving the request signal without determining whether the request signal is valid. Provision is made for selecting one of the modes of operation.

BRIEF DESCRIPTION OF THE DRAWINGS

The foregoing and other objects of the invention will become more readily apparent from the following description of the preferred embodiment of the invention as taken in conjunction with the accompanying drawings which are a part hereof and wherein:

FIG. 1 is a schematic-block diagram illustrating a portable transmitter and a vehicle-mounted receiver employed in the present invention;

FIG. 2 is a flow diagram illustrating the operation of the vehicle receiver herein; and FIG. 3 is a flow diagram illustrating an aspect of the operation of the receiver herein.

DESCRIPTION OF PREFERRED EMBODIMENTS

Reference is now made to the drawings wherein the showings are for purposes of illustrating a preferred embodiment of the invention only, and not for the purpose of limiting same. The remote keyless entry (RKE) system described herein may include one or more remote, portable transmitters which communicate with a vehicle receiver to achieve remote control of the vehicle's door lock mechanism, as well as other vehicle device functions. The portable transmitters include transmitters A and B (only transmitter A being described herein in detail). Each transmitter, sometimes known as a fob, may take the form as transmitter illustrated and described in the U.S. Patent to Lambropoulos, et al. U.S. Pat. No. 4,881,148 which discloses sure is herein incorporated by reference.

Each remote transmitter A and B is assigned a security code unique to the particular transmitter. Each vehicle receiver C is mounted on a vehicle and will permit entry into the vehicle of an operator carrying a transmitter that is coded with the proper security code. The receiver C may take the form of receiver illustrated and described in the U.S. Patent to Lambropoulos, et al. U.S. Pat. No. 4,881,148 the disclosure of which is herein incorporated by reference. In the example being given herein, transmitters A and B are provided with security codes SC-A and SC-B, respectively, which will permit entry into the vehicle in which is mounted receiver C. The receiver C has a normal mode of operation during which it receives from a portable transmitter, such as transmitter A or B, a signal including a security code that uniquely identifies the transmitter together with a function code requesting a particular vehicle device operation, such as unlocking of a vehicle door. The vehicle receiver includes a microcomputer and has a memory that stores one or more security codes each of which uniquely identifies a transmitter that is authorized entry into the vehicle. If the received signal includes a coded portion that matches the stored security code, then the receiver initiates action to perform the commanded vehicle function, such as a vehicle door unlock function.

Each portable transmitter takes the form of transmitter A illustrated in FIG. 1. This transmitter includes a microcomputer having appropriate internal ROMs EEPROMs and RAMs programmed to perform the functions of the system, as described herein, and having sufficient I/O terminals for interconnection with input and output peripherals. The transmitter includes at least one manually operable pushbutton switch 10 which, when closed, actuates an internal circuit to direct battery power to the microcomputer for operation. In response to the closure of this switch, the microcomputer in the transmitter controls the transmitter to transmit a digital signal S. This is preferably a radio frequency (RF) signal having a carrier frequency of 315 MHz. The digital code in the signal is binary with a binary one and a binary zero being distinguished from each other by a difference in length or duration. The digital signal S includes a security code and a function code.

The security code uniquely identifies the transmitter A and thus distinguishes it from other, similar transmitters. The vehicle mounted receiver C may permit several selected transmitters to have valid entry into the vehicle. These may include, for example, transmitters A and B. Only transmitter A is illustrated herein, but transmitter B is identical, except for its security code. The security code is fixed in the memory associated with the microcomputer in the transmitter at the time of manufacture and may be accomplished in the manner described in U.S. Pat. No. 4,881,148. The security code preferably takes the form of four eight bit bytes. A similar security code is provided in the memory associated with the microcomputer in transmitter B.

The function code is transmitted as part of the transmitted signal S from the transmitter A to the vehicle mounted receiver C. This function code preferably takes the form of an eight bit, coded byte with the bits being arranged to represent the function being requested, such as "unlock the vehicle door".

The signal S transmitted by transmitter A has a range in the order of 50 feet. The signal includes a start portion which may includes four bits, a security portion which includes four, eight bit bytes and a function code portion which includes eight bits. This may be followed by a checksum code, as is common in the art.

The vehicle receiver C includes circuitry tuned to the transmitter signal frequency of 315 MHz. The microcomputer in the receiver C, as in the case of the microcomputer in the transmitter A, includes a plurality of internal memories including ROMs, EEPROMs and RAMs.

The internal memories of receiver C store security codes SC-A and SC-B that uniquely identify transmitters A and B respectively. These codes may be set into memory or programmed in the field as described in U.S. Pat. No. 4,881, 148. The receiver C also includes a memory that receives and temporarily stores the function code portion of the digital signal S received from a portable transmitter, such as transmitter A. If the receiver C receives a valid security code from the transmitter A, it will decode the function code and perform requested function, such as unlocking a vehicle door.

In accordance with the present invention, the receiver C has a normal mode of operation and a diagnostic mode of operation. During the normal mode of operation, the receiver receives a digital signal S from a transmitter such as transmitter A and is programmed to compare the security code portion of signal S with the security codes SC-A and SC-B stored in its internal memory. If a match takes place, then the function code received from the transmitter A is decoded and the requested function, such as unlocking a vehicle door, is performed.

The controller has a diagnostic mode of operation during which the security code comparison function is bypassed and the requested vehicle device function is performed in response to receiving the signal S. The microcomputer in receiver C may be placed in the diagnostic mode of operation by any suitable means for selecting this mode. In the embodiment illustrated in FIG. 1, there is provided a pushbutton 20 which upon momentary closure by an operator selects the diagnostic mode of operation. As will be brought out in greater detail hereinafter, the mode of operation reverts to the normal mode when the vehicle's ignition switch is positioned in the "start" position. This is represented by the switch 22 which, upon closure, represents the ignition switch being placed in the "start" position. The microcomputer in the receiver C responds to the closure of the switch and reverts to the normal mode of operation.

In accordance with the present invention, it is contemplated that a vehicle owner having a RKE system such as that shown in FIG. 1 may encounter a malfunction in the system and not know whether the malfunction is in the transmitter A or in the receiver C. A service technician engaged by the owner may test the system to determine whether the malfunction is in the transmitter or the receiver. It is contemplated that the technician has available to him another transmitter E which operates properly and which is identical to transmitter A with the exception that it does not have the same security code SC-A. Instead, the security code in transmitter E may be security code SC-E. This is not a valid security code for the receiver C. If the technician places the receiver C in its diagnostic mode of operation by momentarily closing switch 20, then the microcomputer in the receiver will bypass the security code checking operation. Instead, it will decode the function code portion of a received signal S and perform the requested vehicle device function. The technician may operate switch 10 of the test transmitter E to transmit a digital signal S to the receiver C, which has been placed in the diagnostic mode of operation. If the vehicle door unlocks, then the malfunction is deemed to be in the transmitter A. If the vehicle door does not unlock, then the malfunction is deemed to be in the receiver C. After the test has been completed, the operator may place the ignition switch in the "start" position by closing switch 22 to return the receiver C to its normal mode of operation.

Reference is now made to FIGS. 2 and 3 which illustrate flow diagrams showing the manner in which the microcomputer in the receiver C of FIG. 1 is programmed in accordance with the present invention. The operation commences with the a start condition in step 100. This step is entered when the vehicle receiver C first is supplied with power from the vehicle's battery. In step 102, a determination is made as to whether the ignition switch is in the "start" position. This is represented in FIG. 1 by closure of switch 22. If not, then the procedure advances to step 106. If the ignition switch is in the "start" position, then in step 104, a diagnostic flag in a register within the microcomputer 20 is reset.

The procedure advances to step 106 during which a determination is made as to whether the diagnostic switch 20 has been closed. If it has not, then the procedure advances to step 110 during which the RKE receiver operates in its normal mode of operation. In this mode, it determines whether a received signal S includes a valid security code and if so, it performs the requested function, such as the unlocking of the vehicle doors.

If, in step 106, a determination is made that the diagnostic switch is closed, then a diagnostic flag is set in the microcomputer in step 108. Thereafter, the procedure advances to step 110 during which the vehicle receiver will operate in the diagnostic mode of operation to be discussed in greater detail with reference to FIG. 3.

The procedure noted above in step 110 is illustrated in greater detail in the flow diagram of FIG. 3. In step 112, the vehicle receiver C receives a digital signal S from a transmitter. In step 114, a determination is made as to whether the diagnostic flag has been set. If not, then the receiver operates in the normal mode of operation and advances to step 116 during which the microcomputer determines whether the security code portion of the received signal S is a valid code. This is achieved by comparing the security code portion of the received signal with the security codes SC-A and SC-B stored in the microcomputer's internal memory. If a match exists, then a valid code has been received and the procedure advances to step 118 during which the function code portion of the message S is decoded and the requested function, such as unlocking a vehicle door, is performed. The procedure then returns to step 102. If the received security code is not a valid security code, as determined in step 116, then a vehicle device function is not performed and the procedure returns to step 102.

If in step 114, a determination is made that the diagnostic flag has been set, then the receiver operates in the diagnostic mode of operation by bypassing the comparison step 116 and advancing directly to step 118 to perform the vehicle function, such as unlocking a vehicle door. This permits a service technician during such a diagnostic mode of operation to utilize a test transmitter E (which does not have a valid security code for receiver C) to operate the receiver.

If the door is unlocked as a result of actuating switch 10 of the test transmitter E, then the technician may conclude that the malfunction is in the vehicle owner's transmitter A. If the door is not unlocked as a result of closing switch 10 of the test transmitter E, then the technician may conclude that the malfunction is in the receiver C. Thereafter, the technician resets the diagnostic flag (and thus restores normal operation) by placing the ignition switch in the "start" position. The technician should do this upon completion of his repairs but, even if he fails to do so, the restoration of normal operation will automatically take place when next the car is started.

From the above description of the invention, those skilled in the art will perceive improvements, changes and modifications. Such improvements, changes and modifications within the skill of the art are intended to be covered by the appended claims.

Having described the invention, I claim the following:

1. A keyless vehicle entry receiver for use in a system for controlling a vehicle device function in response to a vehicle function request signal received from a portable transmitter, said receiver comprising:

a controller having a normal mode of operation during which said controller receives said request signal and determines whether said request signal is valid and, if so, said controller initiates said vehicle device function;

said controller having a diagnostic mode of operation during which said controller initiates said vehicle device function in response to receiving said request signal without determining whether said request signal is valid; and means for switching said controller between said modes of operation.

2. A receiver as set forth in claim 1 wherein said request signal includes a security code portion and a function code portion.

3. A receiver as set forth in claim 2 wherein said controller includes means operative during said normal mode of operation for determining whether said security code portion is valid.

4. A receiver as set forth in claim 3 wherein said means for determining compares said received security code portion with a prestored security code.

5. A receiver as set forth in claim 1 wherein said controller is responsive to said switching means for selecting a particular one of said modes of operation.

6. A receiver as set forth in claim 1 wherein said request signal includes a security code portion and a function code portion and wherein said controller is operative during said diagnostic mode of operation for responding to said function code portion independently of said security code portion for initiating said vehicle device function.

7. A receiver as set forth in claim 1 wherein said request signal includes a function code portion and wherein said controller is responsive to said switching means selecting a said diagnostic mode of operation for initiating said vehicle device function in response to said function portion of said request signal and independently of whether said request signal is valid.

* * * * *